(12) United States Patent
Adkins, III et al.

(10) Patent No.: US 9,531,581 B1
(45) Date of Patent: Dec. 27, 2016

(54) METHOD AND SYSTEM FOR IDENTIFYING AND AUTOMATICALLY REGISTERING DOMAIN NAMES

(75) Inventors: James N. Adkins, III, Bellevue, WA (US); Todd Edebohls, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 839 days.

(21) Appl. No.: 11/963,729

(22) Filed: Dec. 21, 2007

Related U.S. Application Data (60) Provisional application No. 61/014,725, filed on Dec. 18, 2007.

(51) Int. Cl.
*G06F 15/16* (2006.01)
*H04L 29/12* (2006.01)
*H04L 29/06* (2006.01)

(52) U.S. Cl.
CPC ......... *H04L 29/12066* (2013.01); *H04L 29/06* (2013.01); *H04L 61/1511* (2013.01)

(58) Field of Classification Search
CPC ............ H04L 29/12066; H04L 61/1511; H04L 29/12009; H04L 29/06; H04L 29/08072
USPC .......................... 709/245, 246, 243, 244, 247
See application file for complete search history.

(56) References Cited

U.S. PATENT DOCUMENTS

| | | | |
|---|---|---|---|
| 5,940,595 A | 8/1999 | Reber et al. | |
| 6,009,103 A | 12/1999 | Woundy | |
| 6,298,341 B1 | 10/2001 | Mann et al. | |
| 6,519,589 B2* | 2/2003 | Mann et al. | |
| 7,007,080 B2 | 2/2006 | Wilson | |
| 7,188,138 B1* | 3/2007 | Schneider | 709/203 |
| 7,526,538 B2 | 4/2009 | Wilson | |
| 7,631,101 B2 | 12/2009 | Sullivan et al. | |
| 7,805,379 B1 | 9/2010 | Adkins et al. | |
| 8,200,583 B1 | 6/2012 | Adkins et al. | |

(Continued)

OTHER PUBLICATIONS

Bethel, Brian, "Eminent Domain; Want to get on the map with your very own Website? Just follow these easy steps", Jul. 26, 2001, The Post—Tribune. Gary, Ind. p. E.3.

(Continued)

*Primary Examiner* — Abdelnabi O Musa
(74) *Attorney, Agent, or Firm* — Knobbe, Martens, Olson & Bear, LLP (57) ABSTRACT

A domain name registration service is described that identifies a domain name source, identifies domain name candidates from the domain name source, and automatically registers any available candidates as domain names. A domain name source may be any source of information from which a set of alphanumeric (and possibly non-ASCII) characters can be acquired. Once candidate domain names have been registered by the domain name service, they may be used by the registrant or offered to third parties. Since such uses may generate revenue for the registrant, such uses may be referred to as "monetization" of the automatically registered domain names.

26 Claims, 7 Drawing Sheets

(56) References Cited

U.S. PATENT DOCUMENTS

| | | | |
|---|---|---|---|
| 2002/0065903 A1* | 5/2002 | Fellman | 709/220 |
| 2002/0099637 A1 | 7/2002 | Wilkinson et al. | |
| 2002/0128985 A1 | 9/2002 | Greenwald | |
| 2003/0120597 A1 | 6/2003 | Drummond et al. | |
| 2003/0229692 A1 | 12/2003 | Vo | |
| 2004/0065461 A1* | 4/2004 | Browning | G07C 5/085 174/50 |
| 2004/0098375 A1* | 5/2004 | DeCarlo, III | 707/3 |
| 2004/0148398 A1* | 7/2004 | Park | 709/227 |
| 2004/0172463 A1* | 9/2004 | King | H04L 29/12009 709/223 |
| 2004/0199397 A1 | 10/2004 | Dresden | |
| 2005/0027882 A1 | 2/2005 | Sullivan et al. | |
| 2005/0080927 A1 | 4/2005 | Anderson et al. | |
| 2005/0105513 A1 | 5/2005 | Sullivan et al. | |
| 2005/0172031 A1* | 8/2005 | Adelman | 709/245 |
| 2006/0004784 A1 | 1/2006 | Ableman et al. | |
| 2007/0094361 A1 | 4/2007 | Hoynowski et al. | |
| 2007/0260518 A1 | 11/2007 | Ronen et al. | |
| 2008/0147541 A1 | 6/2008 | Jones | |
| 2008/0215716 A1* | 9/2008 | Parsons | H04L 12/2602 709/223 |
| 2009/0240812 A1* | 9/2009 | King et al. | 709/226 |
| 2012/0278467 A1* | 11/2012 | Schneider | 709/223 |

OTHER PUBLICATIONS

Houch, Jeff, "Want web address? Talk to the Landlord Boca Man Leases Internet 'Domain' Names", Aug. 16, 1999, Palm Beach Post, West Palm Beach, Fla. pf. 1.B.

Business Wire, "Six-Figure Bid Has Equity.com Leading Sedo's Live GreatDomains Auction", Oct. 23, 2007, Business Wire, New York.

Ransom, Diana, "Running a Business: Starting Up: MyBusinessName.com; Online edition", Dec. 13, 2007, Wall Street Journal, New York, NY.

PR Newswire, "Web 'Real Estate' Rising in Value; Moniker Offers Unique Way to Take Advantage of Opportunity; Will Hold Largest Domain Name Auction at T.R.A.F.F.I.C. Conference; Top Names like Auction.com, HMO.com, DSL.com, Deposit.com Available to Highest Bidders," Oct. 11, 2006, PR Newswire, New York.

Wingfield, Nick, "Internet Companies See Value in Misaddressed Web Traffic", Sep. 5, 2003, Wall Street Journal, New York.

U.S. Appl. No. 11/963,731, filed Dec. 21, 2007, Adkins et al.

* cited by examiner

METHOD AND SYSTEM FOR IDENTIFYING AND AUTOMATICALLY REGISTERING DOMAIN NAMES

CROSS-REFERENCE TO RELATED APPLICATION

This application claims the benefit of U.S. Provisional Patent Application No. 61/014,725, filed Dec. 18, 2007, entitled METHOD AND SYSTEM FOR AUTOMATICALLY REGISTERING DOMAIN NAMES, the disclosure of which is hereby expressly incorporated by reference, and the filing date of which is hereby claimed under 35 U.S.C. §119(e).

BACKGROUND

The Internet has become a popular information resource for even the most unsophisticated user. The popularity of the Internet is due, in part, to the ability to easily locate vast amounts of resources on practically any topic imaginable. However, the vast amount of resources can also hinder those who wish to make information available via the Internet. With so many resources, it is easy for some resources to get lost in the shuffle.

Identifying the right domain name to associate with a network resource, such as a Web site, takes on a high level of importance. Unfortunately, many of the most recognizable or intuitive domain names have already been acquired by other parties. Accordingly, a potential domain name owner may have difficulty obtaining a domain name that will ensure high traffic to their network resource. Even if the potential domain name owner has an idea of the domain name it wishes to use, the process of determining what domain names are available for use can be frustrating. As a result, a domain name owner may ultimately obtain a domain name that does not adequately suit their needs.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Computer networks are well known in the field of communications. Computer networks may include communication links that extend over a local area, a wide area, or may even be global, as is the case of computer networks forming the Internet. The method and system disclosed herein are described in the context of the Internet. However, persons skilled in the art will recognize that the method and system disclosed herein may also be used in other interactive environments, such as local or wide area networks that connect servers storing related documents and associated files, scripts, and databases; or broadcast networks that include set top boxes or other information appliances providing access to audio or video files, documents, scripts, databases, etc. In the Internet context, such documents, files, scripts, etc., that are stored on a server are commonly referred to as a "Web site." However, in general such information can be referred to as a "network resource."

A network resource may be identified by a unique name. In some embodiments, this unique name is known as a "domain name." A domain name is typically a more memorable or human readable alphanumeric name that correlates to one or more numeric IP addresses. An IP address specifically identifies the location in a network of a server or other network device. Multiple IP addresses may be assigned to a single domain name, or multiple domain names may be assigned to a single IP address. In some cases, domain names may be internationalized to include non-ASCII characters. Domain name registrars control the registration of domain names in order to maintain their validity. Typically, only one registrar may modify or delete information about a domain name.

Domain names typically end in a generic top level domain (gTLD) name, such as ".com" or ".biz," or in a country code top level domain (ccTLD) name such as ".de" or ".us." In addition to the top level domains, there are second level domain (SLD) names. These are the names directly to the left of ".com," ".biz," and the other top level domains. The registrars control registration of domain names including the second and top level domains. Further subdomains (i.e., names to the left of the second level domain) may be added freely by the domain name owner without participation by the registrar. Each domain name level may be separated by a dot or period between them. For the purposes of the present disclosure, a domain name may include at least a top level domain and a second level domain, and may further include one or more subdomains. In addition, sample domain names may be referred to herein with or without the prefix "www." Moreover, while the term domain name is used herein to describe network resources, one skilled in the art will appreciate that any type of unique identifier for a network resource (e.g., an IP address, a MAC address, etc.) may be used and not depart from the spirit and scope of the present invention.

Figure 1:
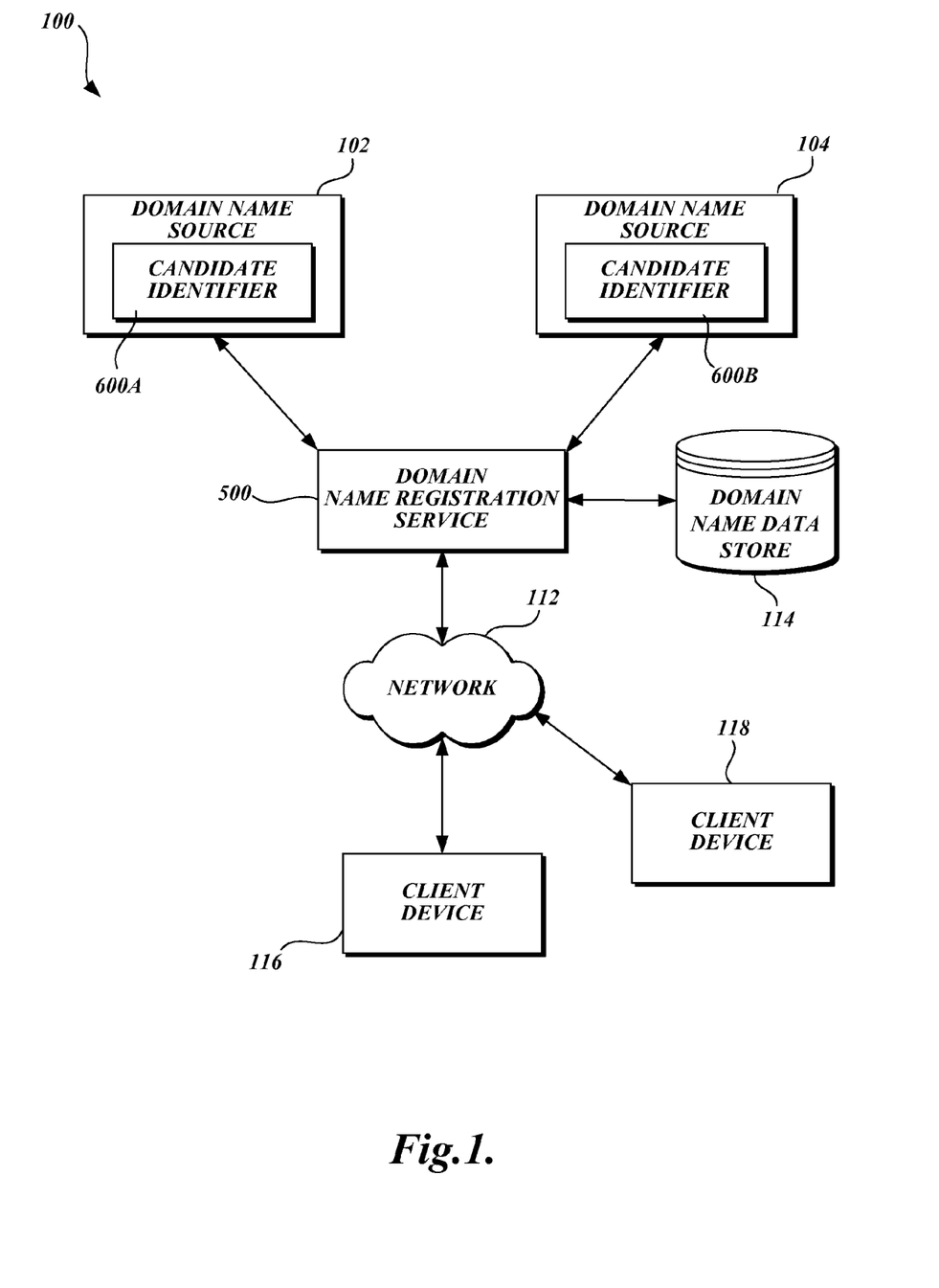
FIG. 1 is a pictorial diagram of an illustrative operating environment for implementing a domain name registration service to automatically register domain names.
Figure 4:
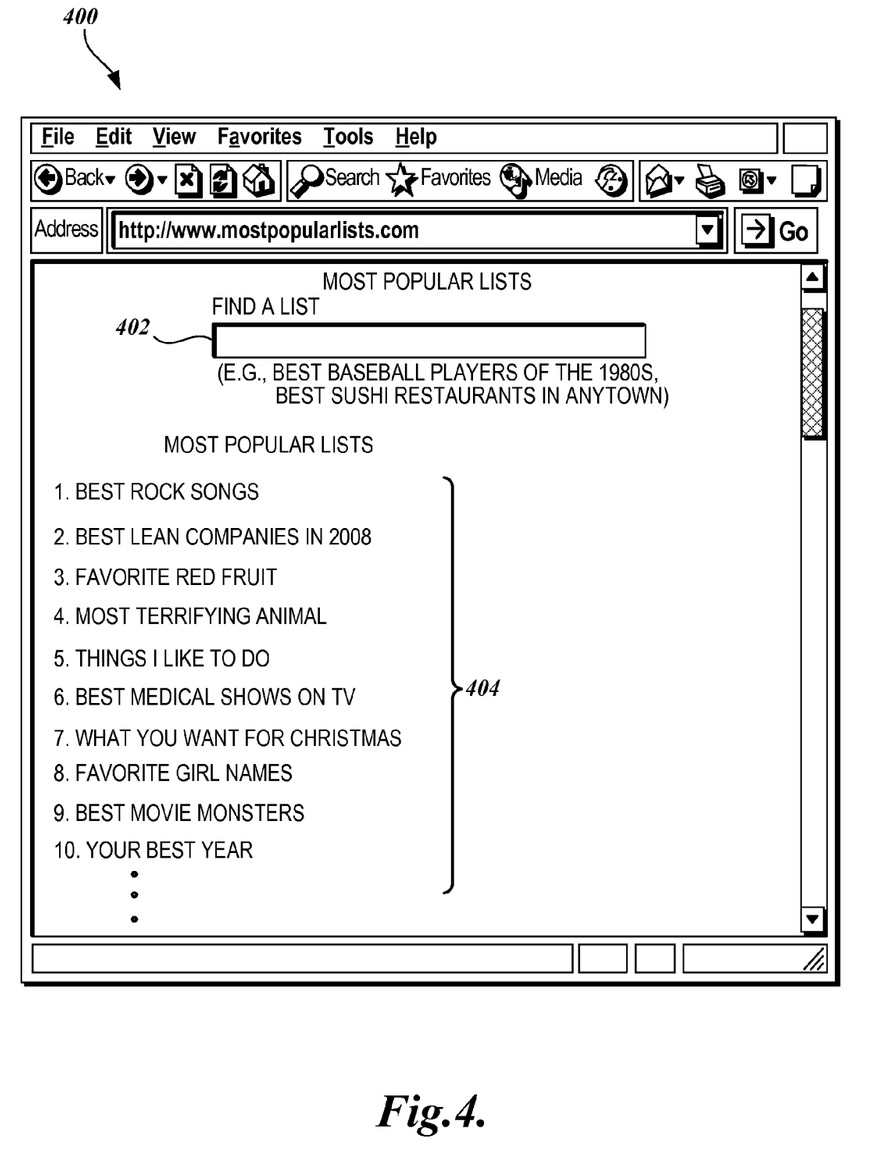
FIG. 4 is a pictorial diagram of an illustrative user interface displaying possible domain name candidates for automatic registration that have been obtained from a domain name source.
Figure 7:
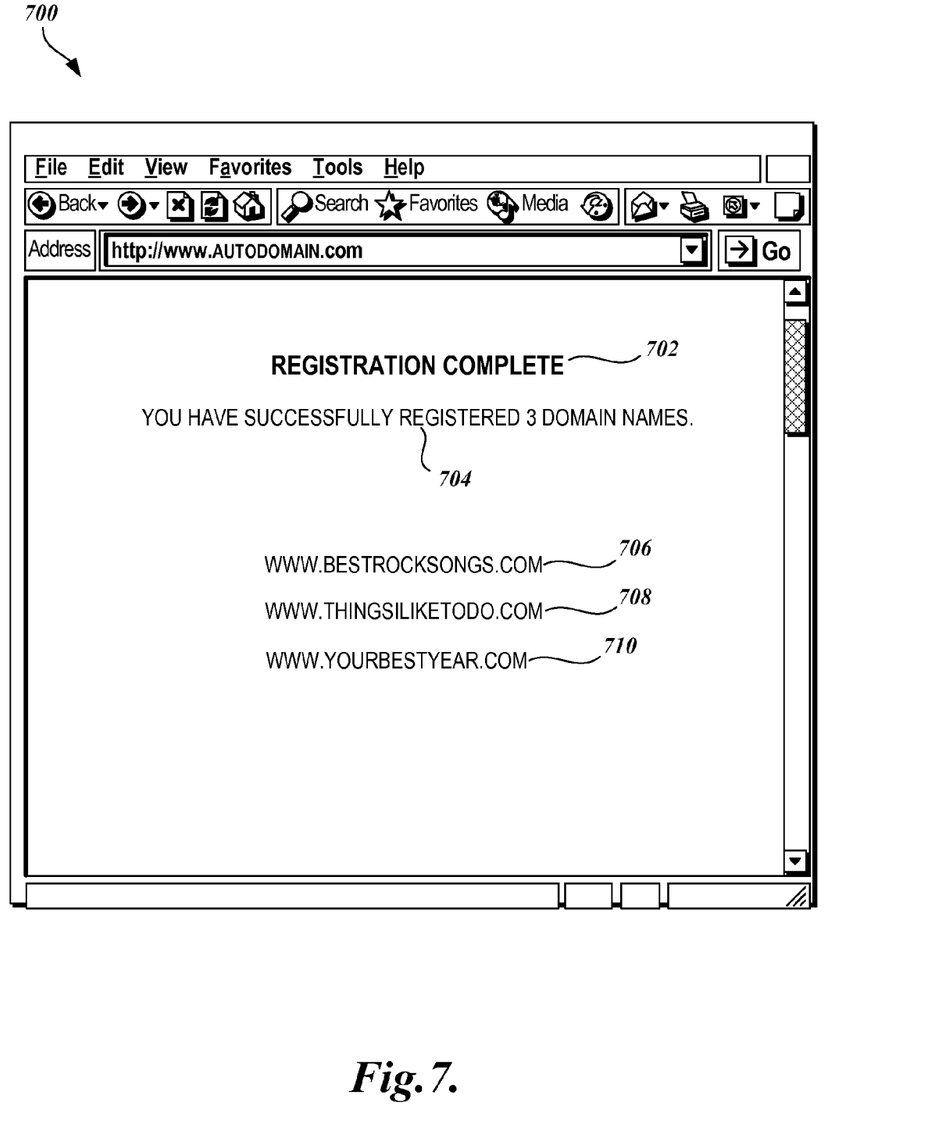
FIG. 7 is a pictorial diagram of an illustrative user interface displaying confirmation of domain name registration.

With reference to FIG. 1, an operating environment 100 is shown including a domain name registration service 500 for automatically registering domain names obtained from a domain name sources 102 and/or 104. The operating environment 100 may further include, but may not be limited to, a network 112, a domain name data store 114, and client devices 116 and 118. In one embodiment, the domain name registration service 500 is a server. In addition to automatically registering domain names, the domain name registration service 500 is generally responsible for providing front end communication with the client devices 116 and 118 via a network 112, such as the Internet. The front end communication provided by the domain name registration service 500 may employ a user interface component for entering text and/or graphics, possibly organized as a Web page or other user interface using hypertext transfer or other protocols in response to information inquiries or requests received from the client devices. Nonlimiting examples to such user interfaces are shown in FIGS. 4 and 7.

In one embodiment, domain name registration service 500 identifies a domain name source, e.g., domain name source 102 and/or 104, identifies domain name candidates from the domain name source, and automatically registers any available candidates as domain names. A domain name source 102 or 104 may be any source of information available via the network 112 (or accessible directly by the domain name service 500) from which a set of alphanumeric (and possibly non-ASCII) characters can be acquired. Accordingly, a domain name source may be data provided by or found on a network resource, e.g., a document, image, Web page, blog, etc. For example, and as described in more detail below in connection with FIG. 4, a domain name source may be a network resource that enables users to create lists of items or information related to any topic of interest to the user(s). The name of each list may be identified as a domain name candidate and automatically registered. In another example, the domain name source may be a network resource that enables users to tag items or information of interest. The name of each tag may be identified as a domain name candidate and automatically registered. In yet another example, the domain name resource may be a document retrieved from a network resource and analyzed for statistically improbable phrases, i.e., distinctive phrases within the text of the document, or for atomic terms. The statistically improbable phrases or atomic terms may be identified as a domain name candidates and automatically registered.

In some embodiments, the domain name source may be data supplied to a network resource rather than provided by or found on a network resource. For example, search terms or keywords entered by users of a network resource with search functionality may be extracted and automatically registered as domain names by the domain name registration service 500. In another example, questions entered by a user for processing by a network resource may be used as a source for a domain name. Conversely, the answers or responses provided by the network resource may be used as a domain name candidate for registration. In yet another example, a domain name source may be information collected by a network crawler or other software agent used to gather information from network resources. One skilled in the art will also appreciate that virtually any network resource, or data provided to, found on or provided by any network resource, may be used as a source for domain names. Thus, the examples described herein should not be construed as limiting.

While virtually any network resource, or data provided to, found on or provided by any network resource may be used as a source for domain names, not all domain name candidates identified from such sources ultimately prove to be valuable or useful. Those skilled in the art will appreciate that some domain name sources may inherently lend themselves to more useful domain names than others. For example, the lists created using the domain name source noted above often reflect items or information currently of interest or demand (collectively "interest") to users of the network resource. Accordingly, the names of such lists may already indicate interest or demand around a topic, and thus, prove to be useful domain names. Similarly, search terms or keywords entered by users to network resources with search functionality may an indicator of a trend in user interest or demand around a topic, and thus, may prove to be useful domain names. However, in some embodiments, regardless of the nature of the domain name source, additional information or analysis may be used to filter out undesirable domain name candidates (i.e., domain name candidates less likely to be useful) and/or identify desirable domain name candidates (i.e., domain name candidates more likely to be useful). Such embodiments are described in more detail below.

Returning to FIG. 1, each domain name source 102 and 104 may include a candidate identifier 600A or 600B. Candidate identifier 600A or 600B identifies domain name candidates from the domain name source 102 or 104, respectively, and submits the domain name candidates to the domain name registration service 500 for possible registration, if available. One embodiment of a candidate identifier is described in more detail below in FIG. 6. However, those skilled in the art will appreciate that how the candidate identifier identifies domain name candidates depends, at least in part, on the type of domain name source from which it is identifying domain name candidates.

The candidate identifier 600A or 600B may also utilize additional information or analysis as noted above to identify undesirable/desirable domain name candidates. Such additional information or analysis will also likely depend, at least in part, on the type of domain name source from which the candidate identifier is identifying domain names. For example, if the domain name source is a network resource such as that noted above that enables users to create lists regarding items or information of interest, ranking information for such lists may be used by the candidate identifier 600A to determine which lists, and thus which list names, are more desirable. More specifically, the rate at which a list is increasing in popularity may be used by the candidate identifier to determine if the name associated with the list is a more desirable domain name candidate. Alternatively or in addition, the rate at which items are added to a list may be used by the candidate identifier to determine if the name is a more desirable domain name candidate. Conversely, if a list is decreasing in popularity and/or if items are no longer being added to a list, the candidate identifier may consider the name of the list to be undesirable. Accordingly, the name of the list would not be identified by the candidate identifier as a domain name candidate or would not be submitted as a domain name candidate to the domain name registration service 500.

As another example, if the domain name source includes questions entered by a user for processing by a network resource; information regarding the reputation of the user, the frequency the same or similar question is asked, the number of responses and/or people responding, the rate at which responses are received, the amount of payment offered by the user to respond to the question, etc. may be used by the candidate identifier 600A to determine if a question is a desirable domain name candidate. Conversely, if responses to questions provided by the network resource are used as a domain name source, similar information, as well as ranking information for responses to the same or similar question, may be used to determine if an answer is a desirable domain name candidate.

In yet other embodiments, the candidate identifier 600A may submit domain name candidates to one or more humans for further review, e.g., directly via the domain name registration service 500 or via another network resource that coordinates humans to perform human intelligence tasks. In some cases, a human may make a subjective recommendation to submit the domain name candidate to the domain name registration service 500. In other cases, humans are enabled to vote on or rank domain name candidates. Accordingly, the candidate identifier may submit the domain name candidates with sufficient votes or rank to the domain name registration service 500. In yet other cases, a human may modify the domain name candidate, e.g., remove unnecessary or undesirable terms and/or characters.

Rather than allow the candidate identifier 600A to identify undesirable/desirable domain name candidates prior to registration, the domain name registration service 500 may automatically register domain name candidates without such analysis and then conduct further analysis post-registration to identify undesirable/desirable domain names.

Now that domain name sources have been generally described, a specific embodiment of a domain name source will be described. In the embodiment illustrated in FIG. 4, domain name source 102 is a network resource, www.mostpopularlists.com, that enables users to create lists of items or information related to any topic of interest to the user(s). Those skilled in the art will recognize that the names of such lists may capture the attention of users, and thus, may often prove to be valuable domain names. In the illustrated example, the names 404 of the top ten most popular lists available at www.mostpopularlists.com are displayed in a user interface 400. In one embodiment, the name of each list, e.g., "BEST ROCK SONGS," "BEST LEAN COMPANIES IN 2008," etc., is identified as a domain name candidate and automatically registered by the domain name registration service 500, if available for registration. More specifically, the candidate identifier 600A identifies the name of each list, removes the spaces between terms in the name (e.g., using a parsing algorithm) and submits the name as a domain name candidate to the domain name registration service 500. In some embodiments, the candidate identifier 600A uses ranking information for the lists to determine which names to submit as domain name candidates to the domain name registration service 500. The candidate identifier 600A may also capture search terms entered in search field 402 (and remove any spaces between search terms) and submits the search terms as a domain name candidates to the service 500.

Returning to FIG. 1, once the candidate identifier 600A or 600B submits domain name candidates to the domain name registration service 500, the domain name registration service 500 automatically registers all available domain names and stores the domain names in the domain name data store 114 as will be described in more detail below. The domain names may then be used by the registrant, e.g., the operator of the domain name service 500 or a party on behalf of whom the domain name registration service 500 automatically registered the domain names. Alternatively, the domain names may be offered for sale, lease, or use to, or for the benefit of, third parties. In one embodiment, a third party may browse the domain names registered by the service 500 using a client device in communication with domain name service 500, e.g., client devices 116 or 118. The client devices 116, 118 may be any one of a number of computer devices including, but not limited to, personal computers (PCs), laptop computers, personal digital assistants (PDAs), set top boxes, mobile telephones, digital media players, two-way pagers, electronic reader devices, etc.

The domain name registration service 500, domain name sources 102 and 104, and client devices 116 and 118 may be configured for communication via a network 112. The network 112 may be a wired and/or wireless network, a cable network, a local area network ("LAN"), a larger network such as a wide area network ("WAN"), a collection of networks such as the Internet, etc. Because protocols for a network communication, such as TCP/IP, are well known to those skilled in the art of computer networks, these protocols and other methods used to implement the network 108 are not disclosed in further detail herein.

The operating environment 100 depicted in FIG. 1 is illustrated as a distributed computer environment, including several computer systems that are interconnected using one or more computer networks. However, it will be appreciated by those skilled in the art that the operating environment 100 could have fewer or greater components than illustrated in FIG. 1. For example, the operating environment 100 could include various Web services, components, and peer-to-peer network configurations. Thus, a depiction of the operating environment in FIG. 1 should be taken as illustrative and not limiting to the present disclosure.

One skilled in the relevant art will also appreciate that the data and/or components described above may be stored on a computer-readable medium and loaded into a memory of the domain name registration service 500 and/or domain name source 102 or 104 using a drive mechanism associated with the computer-readable medium, such as a floppy, CD-ROM, DVD-ROM, or network interface. Further, the components can be included on a single device or distributed in any manner. For example, all components could be located on the domain name registration service 500. Furthermore, the components shown in FIG. 1 represent an illustrative embodiment. In other embodiments, components, e.g., candidate identifier 600A or 600B, can be removed, or their functionality can be provided by another component.

Figure 2:
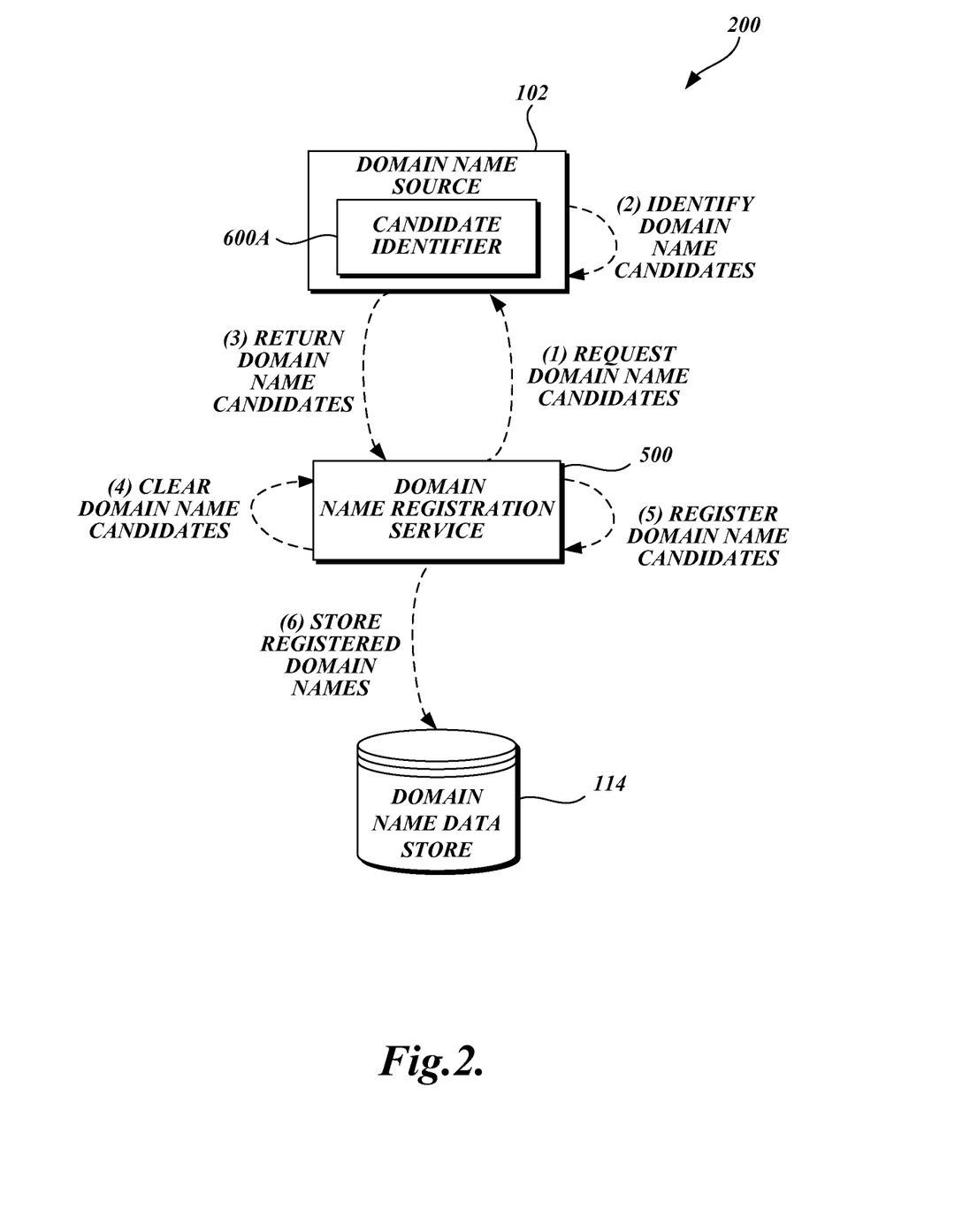
FIG. 2 is a block diagram of a domain name registration service registering domain name candidates and storing them in a domain name data store.

With reference now to FIG. 2, the interaction of various components of the operating environment 100 to identify and automatically register domain names will now be described. As noted above, domain name registration service 500 may register domain name candidates identified from a domain name source 102 or 104. In one embodiment, a user may select a domain name source and identify it to the domain name registration service 500. Alternatively, potential domain name sources may be identified programmatically by the domain name registration service itself or by the operator of the domain name registration service. Once a domain name source is identified, the domain name service 500 may request domain name candidates from the domain name source. Those skilled in the art will recognize that the domain name service 500 may request domain name candidates from a domain name source only once, a limited number of times, and/or on an ongoing, periodic or a periodic basis. In addition, those skilled in the art will recognize that in other embodiments the domain name source may submit domain name candidates to the domain name registration service 500 without specifically being requested by the service 500 to do so.

In the illustrated embodiment, the domain name source 102 receives a request for domain name candidates from the domain name registration service 500. In response to the request, the domain name source 102 identifies domain name candidates utilizing the candidate identifier 600A. One embodiment of a candidate identifier is described in more detail below in connection with FIG. 6. The domain name source 102 then returns the domain name candidates to the domain name registration service 500.

The domain name registration service 500 clears and registers domain name candidates that are found to be available for registration (i.e., domain name candidates that have not been previously registered by another party) as domain names. For example, the candidate identifier 600A may have identified five domain name candidates from the domain name source 102. For each domain name candidate, the domain name registration service 500 performs a clearance search to ensure the domain name candidate is available for registration. In other words, the domain name registration service 500 determines if the domain name candidate has already been registered with a domain name registrar. Such a search may be conducted of existing domain name registrars using techniques known in the art, and thus, need not be described in more detail herein. A trademark clearance search may also be conducted. In one embodiment, the domain name candidate is only cleared with respect to one ccTLD or gTLD, e.g. ".us" or ".com." In other embodiments, the domain name is cleared with respect to a plurality or all ccTLDs and gTLDs. A domain name may be considered available if it has not yet been registered in at least one of the ccTLDs or gTLDs subject to the search.

Returning to the illustrated example, it is presumed for purposes of discussion that the domain name candidates are cleared with respect to only the ".com" gTLD. Accordingly, if two of the five domain name candidates are already registered by other parties, three domain name candidates are available for registration. Accordingly, the domain name registration service 500 registers the available domain name candidates for use as domain names. In some embodiments, the domain name registration service 500 may also automatically clear and register common misspellings for domain name candidates. Automatic registration of domain name candidates is discussed in more detail below in conjunction with FIG. 5. After all available domain name candidates are registered, the domain name candidates are stored in the domain name data store 114. In some embodiments, both the registered domain names and the domain name candidates are stored in the domain name data store 114. Moreover, the domain name data store 114 may also store performance information, purchase or lease information, and registration information for each domain name.

Once candidate domain names have been registered by the domain name service 500, they may be used by the registrant, e.g., the operator of the domain name registration service 500 or a specific third party for whom the service 500 has registered domain names, or offered to third parties. For example, the registrant may use an automatically registered domain name for another of its own network resources or to redirect traffic to one or more of its own network resources or the network resource(s) of a third party. As another example, the registrant may use the automatically registered domain name to identify a network resource that offers sponsored advertisements or sponsored links. Accordingly, the registrant may generate revenue from any such sponsored advertisements or links selected by users of the network resource. As yet another example, the registrant may use an automatically registered domain name to generate traffic to a particular network resource and then provide information and statistics on such traffic, as well as related links to other network resources, either freely or for a fee. The registrant may also develop a network resource related to an automatically registered domain name. For example, the registrant may develop a retail Web site identified by the automatically registered domain name that offers goods and services for sale that relate to the domain name. The examples referred to above can result in the generation of revenue on behalf of the registrant. Accordingly, using the automatically registered domain names in such a manner may be referred to as "monetizing" the domain names.

In yet other embodiments, the domain name registration service 500 may monitor the performance of automatically registered domain names, e.g., the performance as domain names are used in any of the manners described above. If the performance of the domain name is in sufficient, e.g., traffic to the network resource identified by the domain name is below a certain threshold, traffic to the network resource identified by the domain name is decreasing significantly over time, insufficient revenue is being generated by the sponsored advertisements associated with the domain name, etc., the domain name service 500 may determine that the domain name is undesirable and cancel the registration or allow it to lapse.

In yet further embodiments, the automatically registered domain names are offered for sale to third parties (in which case, ownership is transferred to the purchasing party) or for lease to third parties. An illustrative method and system for leasing domain names is disclosed in co-pending, co-owned U.S. application Ser. No. 11/963,731 entitled METHOD AND SYSTEM FOR LEASING AND PURCHASING DOMAIN NAMES and filed concurrently herewith on Dec. 21, 2007.

In the illustrated embodiment, automatically registered domain names are offered for sale to third parties by the domain name registration service 500. In such cases, a third party may browse a list of domain names available for purchase and/or conduct a keyword search for domain names of interest via user interfaces displayed by a browser implemented on a client device 116 or 118. Since search engines, search interfaces and browse interfaces are known in the art, such components need not be described in further detail herein. In yet other embodiments, a user may search for domain names offered for sale by category. For example, a user may desire a domain name under a category of "rock music." Upon selection of the category, the domain names falling in the category are presented to the user for selection.

Figure 3:
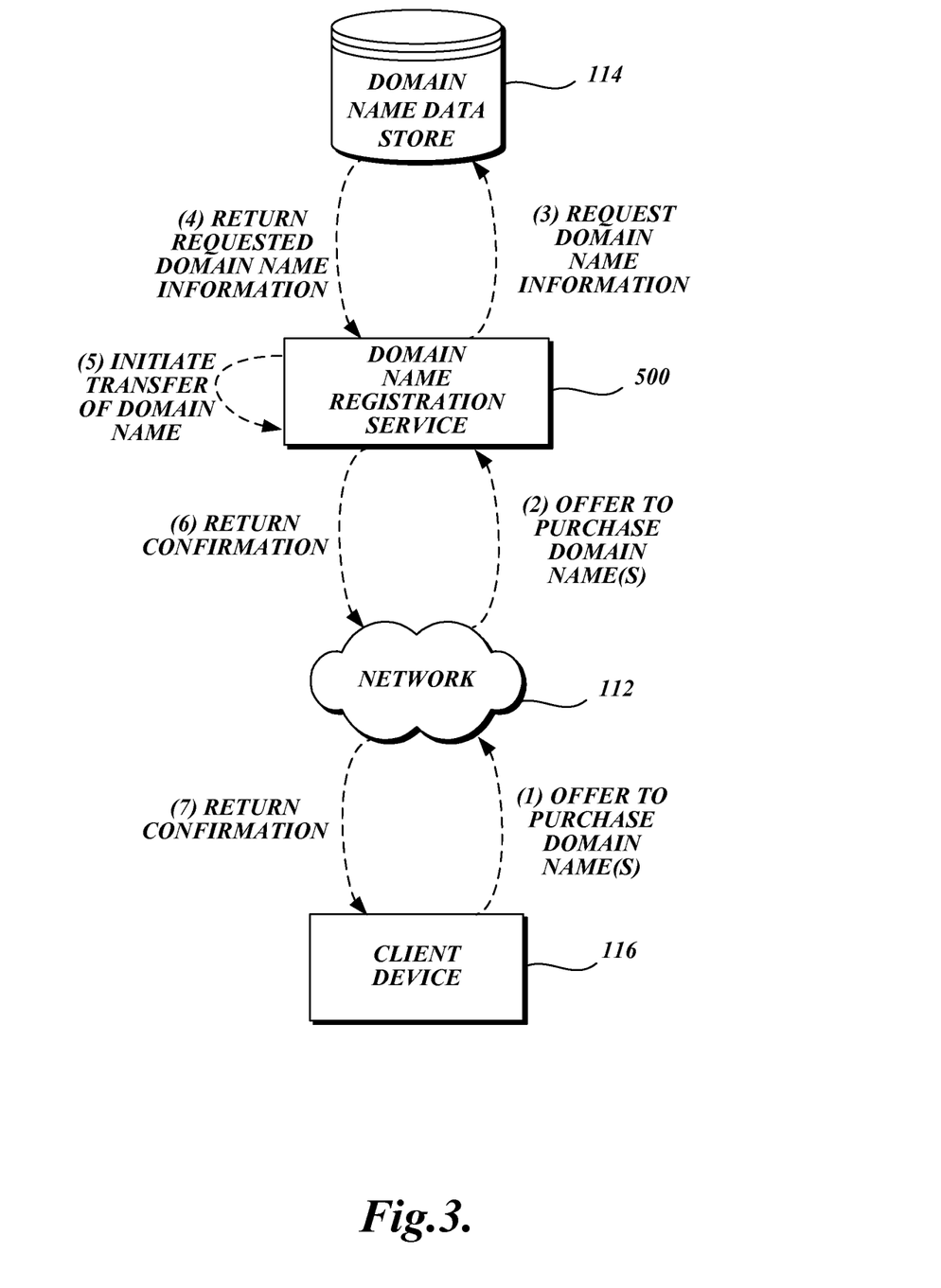
FIG. 3 is a block diagram of a client device submitting an offer to purchase a domain name to the domain name registration service shown in FIG. 1.

With reference now to FIG. 3, the interaction of various components of the operating environment 100 to purchase one or more domain names from the domain name registration service 500 is described. The user may search for and/or identify one or more domain names as described above and submit, to the domain name registration service 500 via client device 116, an offer to purchase the domain name for a specified purchase price. The offer to purchase the domain name(s) is sent via a network 112 to the domain name registration service 500. The domain name registration service 500 receives the purchase offer and requests information related to the domain name(s), e.g., registration information, from the domain name data store 114. In turn, the domain name data store 114 returns the domain name information to the domain name registration service 500. The domain name registration service then initiates transfer of the domain name(s) to the user. In one embodiment, the domain name registration service 500 is itself a registrar. In such cases, the domain name registration service automatically registers domain names itself, and subsequent transfer of the domain names is straightforward. The service 500 simply gathers the appropriate registration information and fee from the user (user interfaces for which are known in the art, and thus, need not be described in more detail herein) and updates registration information for the domain name stored in the domain name data store 114 with the new owner. In embodiments where the domain name registration service 500 does not also act as a registrar, the service initiates transfer of the domain name via the registrar with which the domain name is registered. Those skilled in the art will recognize that such initiation may be conducted programmatically and/or with assistance of a human administrator. Once transfer is complete, the domain name registration service 500 returns confirmation of registration to the client device 116 via the network 112. An illustrative user interface 700 for displaying such confirmation is depicted in FIG. 7, which is described in more detail below.

Figure 5:
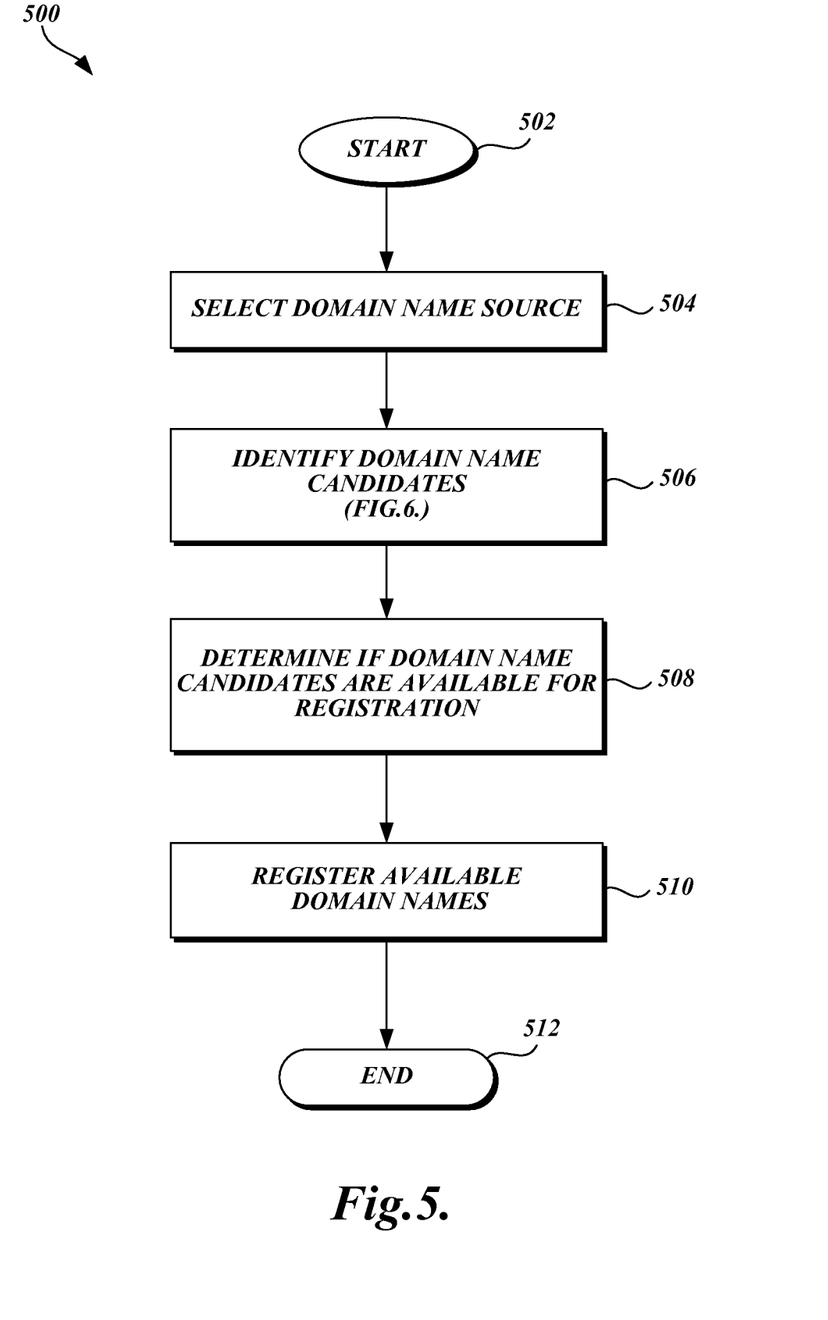
FIG. 5 is a flow diagram of an illustrative routine for identifying and automatically registering domain names obtained from a domain name source.

Referring now to FIG. 5, a sample routine implemented by the domain name registration service 500 to identify and register domain names from a domain name source is illustrated. The routine begins at block 502 and moves to block 504 where the domain name registration service 500 selects a domain name source. As noted above, a user may select a domain name source and identify it to the domain name registration service 500 or a domain name source may be identified programmatically by the domain name registration service itself or by the operator of the domain name registration service. At block 506, domain name registration service 500 identifies domain name candidates from the domain name source. As noted above, the domain name candidates may be identified by a candidate identifier implemented by the domain name source itself and then submitted by the candidate identifier to the service 500. Alternatively, the domain name registration service 500 may implement the candidate identifier. An illustrative routine for identifying domain name candidates from a domain name source is discussed in more detail below in conjunction with FIG. 6.

At block 508, the domain name registration service determines which domain name candidates are available for registration. For instance and as described above, the domain name registration service 500 performs a clearance search to ensure the domain name candidates are available for use. Those domain names that appear available from the search are then automatically registered by the domain name registration service 500 in block 510 and the registered domain names are stored in the domain name data store 114 for use as described above. Once registration is complete, the routine terminates in block 512.

Figure 6:
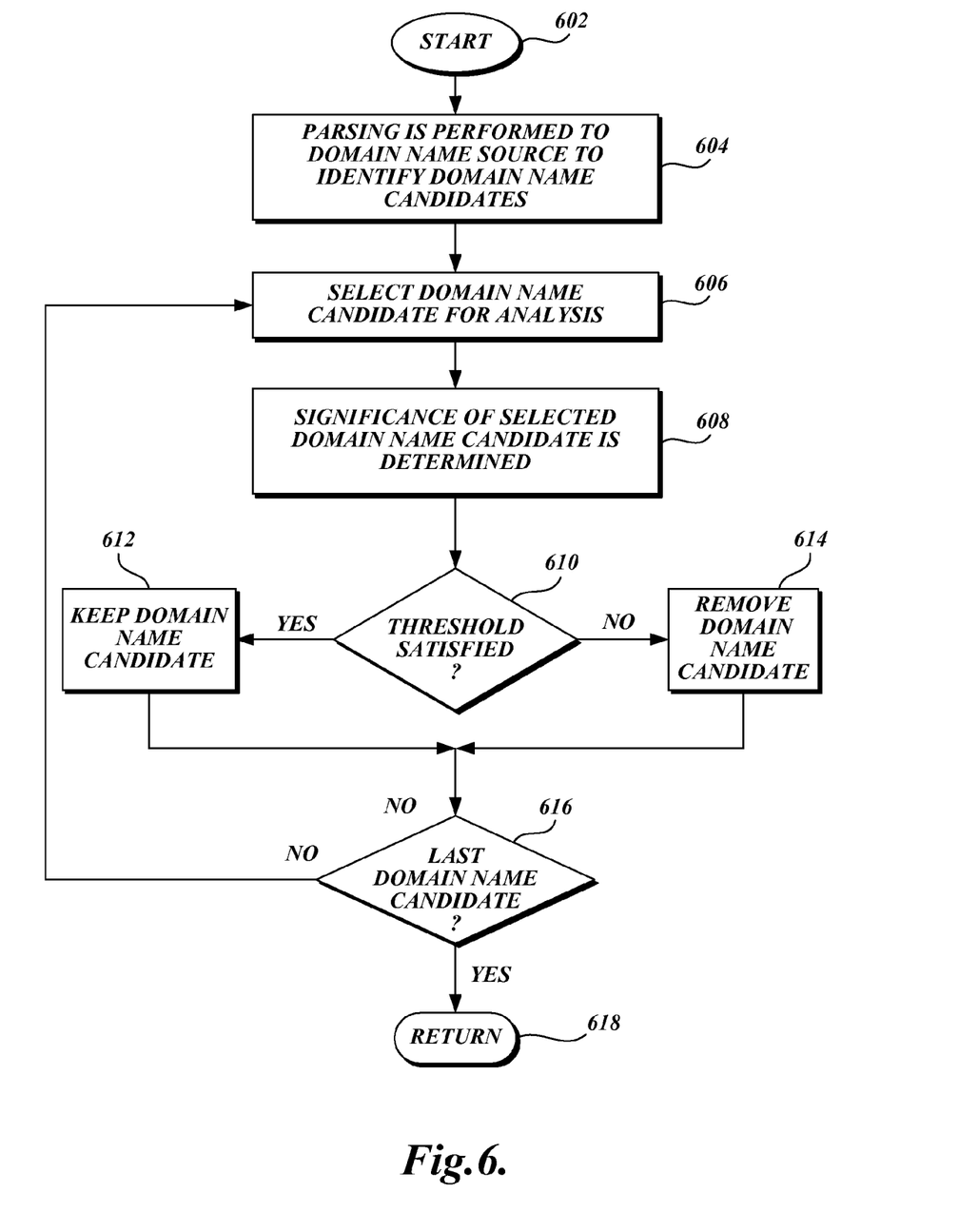
FIG. 6 is a flow diagram of an illustrative routine for obtaining domain names from a domain name source.

An illustrative routine for identifying domain name candidates from a domain name source, such as a document obtained from a network resource, is depicted in FIG. 6. The routine 600 begins at block 602 and moves to block 604 where parsing is performed upon the document obtained from the domain name source to identify domain name candidates. Identification of domain name candidates may be performed using string-based parsing algorithms that identify discrete words and phrases.

At block 606, the routine 600 selects a parsed phrase and performs an analysis to determine whether the selected phrase should be selected as a domain name candidate. In one embodiment, the analysis quantifies the statistical improbability of the selected phrase in relation to the rest of the document. If the phrase satisfies a threshold level of statistical improbability, the phrase may be selected as a domain name candidate. In another embodiment, the string-based parsing algorithm identifies characters that may signify a heading within the document (e.g., numbers, roman numerals, bullet points, and the like). Each heading may then be identified as a domain name candidate.

Once a domain name candidate is selected, the significance of the domain name candidate is determined at block 608. In one embodiment, the significance is calculated based on the frequency in which the domain name candidate appears in the current domain name source. In this regard, a value that represents the frequency of the selected domain name candidate among other phrases within the current domain name source is determined. This value may then be used to calculate a score that represents the statistical significance of the selected domain name candidate. By way of example only, each domain name candidate may begin with a score of zero. Each time the domain name candidate appears in the domain name source, the score may be incremented. The more the domain name candidate appears in the domain name source, the higher the score the domain name candidate obtains. The score of the domain name candidate may then be measured against a threshold to determine if the domain name candidate should be registered.

More specifically, at decision block 610, the routine 600 determines if the value calculated at block 608 that represents the significance of the domain name candidate satisfies a threshold. In one embodiment, the threshold is manually determined. If the value satisfies a threshold, the routine 600 proceeds to block 612 where the domain name candidate is kept for ultimate submittal to the domain name registration service 500. If the value does not satisfy a threshold, the routine 600 proceeds to block 614 where the domain name candidate is removed from consideration. The routine 600 then moves to decision block 616 where the routine 600 determines if the current domain name candidate is the last domain name candidate. If not, the routine 600 repeats to blocks 606 through 616 until the last domain name candidate is processed. Once the last domain name candidate is processed, the routine 600 terminates in block 618.

As noted above, once a domain name has been identified and registered, it may ultimately be offered for sale to a third party. Upon purchase and transfer of ownership to the third party is complete, the domain name registration service 500 may return a confirmation of registration to the client device 116 utilized by the third party via the network 112. An illustrative user interface 700 for displaying such confirmation is depicted in FIG. 7. For example, a "REGISTRATION COMPLETE" message 702 may be displayed along with the domain names that were successfully registered in the name of the third party. In the illustrated example, three domain names were successfully transferred and registered in the name of the third party, i.e., www.bestrocksongs.com 706, www.thingsiliketodo.com 708, and www.yourbestyear.com 710. As a result, the third party knows exactly which domain names were successfully purchased.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

While illustrative embodiments have been illustrated and described, it will be appreciated that various changes can be made therein without departing from the spirit and scope of the invention.

What is claimed is:

1. A configured computer system comprising:
   a domain name data store configured to store domain names and registration information for domain names; and
   one or more computing devices communicatively coupled to the domain name data store, the one or more computing devices configured to execute computer-executable instructions to at least:
      automatically retrieve information from one or more network resources;
      programmatically identify a domain name source for candidates for domain name registration using the information that is automatically retrieved;
      analyze data from the programmatically identified domain name source for a statistically improbable phrase or an atomic term;
      identify a candidate for domain name registration from the statistically improbable phrase or the atomic term;
      detect that a value representing a significance of the candidate for domain name registration satisfies a threshold indicating that the candidate for domain name registration is desirable;
      determine that the candidate desirable for domain name registration is available for registration;
      automatically register, as a domain name, the candidate that is desirable and available for registration; and
      store the domain name and registration information for the domain name in the domain name data store.

2. The system of claim 1, wherein the one or more computing devices are further configured to offer the domain name that is automatically registered to a third party.

3. The system of claim 2, wherein the one or more computing devices are further configured to transfer ownership of the domain name that is automatically registered to the third party.

4. The system of claim 1, wherein the one or more computing devices are further configured to submit the domain name candidate to a human for review.

5. The system of claim 1, wherein the one or more computing devices are further configured to:
   identify another candidate for automatic registration as a domain name;
   determine that the other candidate for domain name registration is undesirable; and
   filter out the other candidate for domain name registration in response to determining that the other candidate for domain name registration is undesirable.

6. A computer-implemented method for automatically registering unique identifiers of network resources, the method comprising:
   as implemented in one or more computer systems configured with specific computer-executable instructions,
      programmatically identifying a source of information from which a set of characters can be acquired from information retrieved from a network resource in communication with the one or more configured computer systems;
      analyzing the programmatically identified source of information for a statistically improbable phrase or an atomic term;
      identifying a unique identifier candidate from the statistically improbable phrase or the atomic term;
      detecting that a value representing a significance of the unique identifier candidate satisfies a threshold indicating that the unique identifier candidate is desirable;
      determining that the unique identifier candidate is available for registration; and
      automatically registering the unique identifier candidate as a unique identifier in response to said detecting and said determining.

7. The computer-implemented method of claim 6, wherein the unique identifier is a domain name and the unique identifier candidate is a domain name candidate.

8. The computer-implemented method of claim 7, wherein determining that the domain name candidate is available for registration comprises conducting a search of registration information maintained by one or more domain name registrars.

9. The computer-implemented method of claim 8, wherein the search is conducted with respect to one or more top level domains.

10. The computer-implemented method of claim 7 further comprising offering the domain name that is automatically registered to a third party.

11. The computer-implemented method of claim 7 further comprising monetizing the domain name that is automatically registered.

12. The computer-implemented method of claim 6 further comprising storing the unique identifier in a data store along with registration information for the unique identifier.

13. A system, implemented in one or more configured computer systems, for automatically registering domain names, the system comprising:
   a data store configured to store specific computer-executable instructions; and
   one or more computing devices in communication with the data store, the one or more computing devices configured to execute the specific computer-executable instructions to at least:
      identify a domain name source from information automatically retrieved from one or more network resources;
      analyze data from the domain name source for a statistically improbable phrase or an atomic term;
      identify a domain name candidate from the statistically improbable phrase or the atomic term;
      calculate a value representing a significance of the domain name candidate;
      determine that the value satisfies a threshold indicating that the domain name candidate is desirable; and
      automatically register the domain name candidate as a domain name.

14. The system of claim 13, wherein the one or more computing devices implement a domain name registrar.

15. The system of claim 13, wherein the domain name source includes data provided by a network resource of the one or more network resources.

16. The system of claim 13, wherein the domain name source includes data provided to a network resource of the one or more network resources.

17. The system of claim 13, wherein the one or more computing devices are further configured to monetize the domain name.

18. The system of claim 13, wherein the one or more computing devices are further configured to:
   determine that the domain name candidate is available for registration; and
   in response to determining that the value satisfies a threshold and determining that the domain name candidate is available for registration, automatically register the domain name candidate as the domain name.

19. The system of claim 13, wherein the one or more computing devices are further configured to monitor performance of the domain name that is automatically registered.

20. The system of claim 19, wherein the performance of the domain name is associated with traffic to a network resource identified by the domain name.

21. The system of claim 13, wherein the domain name registration service is further configured to identify the candidate for automatic registration as a domain name based at least partly on ranking information.

22. The system of claim 13, wherein the domain name source comprises at least one of a document, an image, a Web page, or a blog.

23. A computer-readable non-transitory storage medium having computer executable components for automatically registering domain names using one or more computing devices, the computer executable components comprising:
   a domain name source component configured to programmatically identify a domain name source using information automatically collected by a network crawler from one or more network resources, the network crawler implemented by the domain name source component, the domain name source likely to generate candidates that are of interest;
   a candidate identifier component configured to:
      analyze the programmatically identified domain name source for a statistically improbable phrases or an atomic term;
      identify a candidate for automatic registration as a domain name from the statistically improbable phrase or the atomic term; and
      detect that a value representing a significance of the candidate satisfies a threshold indicating that the candidate is desirable; and
   a domain name registration component configured to:
      determine that the candidate identified by the candidate identifier component is available for registration; and
      automatically register the candidate as a domain name in response to determining that the candidate is available for registration and the candidate identifier component detecting that the value satisfies the threshold.

24. The computer-readable non-transitory storage medium of claim 23, further comprising a user interface component configured to enable a third party to submit an offer to purchase the domain name that is automatically registered.

25. The computer-readable non-transitory storage medium of claim 23, wherein the domain name registration component is configured to automatically register the candidate as a domain name if the candidate has not already been registered as a domain name.

26. The computer-readable non-transitory storage medium of claim 23, wherein the domain name registration component is further configured to cancel registration of the domain name based at least in part on performance of the domain name.

* * * * *